Oct. 1, 1935.  S. W. SEELEY  2,015,732

CONDENSER WITH TEMPERATURE COMPENSATION

Filed June 21, 1933

INVENTOR-
Stuart W. Seeley
BY
ATTORNEY-

Patented Oct. 1, 1935

2,015,732

UNITED STATES PATENT OFFICE 2,015,732

CONDENSER WITH TEMPERATURE COMPENSATION

Stuart W. Seeley, Jackson, Mich., assignor, by mesne assignments, to Radio Corporation of America, New York, N. Y., a corporation of Delaware Application June 21, 1933, Serial No. 676,815

2 Claims. (Cl. 175—41.5)

This invention relates to electrical condensers. The capacity of a condenser varies directly as its area and inversely as the distance between the plates. The equation of a condenser is:

$$C = \frac{kA}{D}$$

where $k$ is a constant A is the plate area and D is the distance between the plates of opposite charge. If the temperature of a condenser increases, the area A is increased due to the coefficient of expansion of the plates. This change in area from temperature variation is a function of the square of the coefficient of expansion of the particular metal used. As the temperature changes the distance between the stator plates also changes due to the expansion or contraction of the spacing washers. The distance D varies directly as the coefficient of expansion. The coefficient of expansion therefore appears as the square of the numerator of the right hand side of the above equation and as a linear function in the denominator. Increase of temperature accordingly increases the capacity of the condenser as a linear function of the coefficient of expansion of the metal used.

In many instances it is quite material to maintain a constant capacity, for example, in broadcast and other transmission systems.

It is an object of this invention to produce a condenser that has constant capacity regardless of temperature changes as will more fully appear in the annexed specification, reference being had to the drawing, in which.

Figure 1:
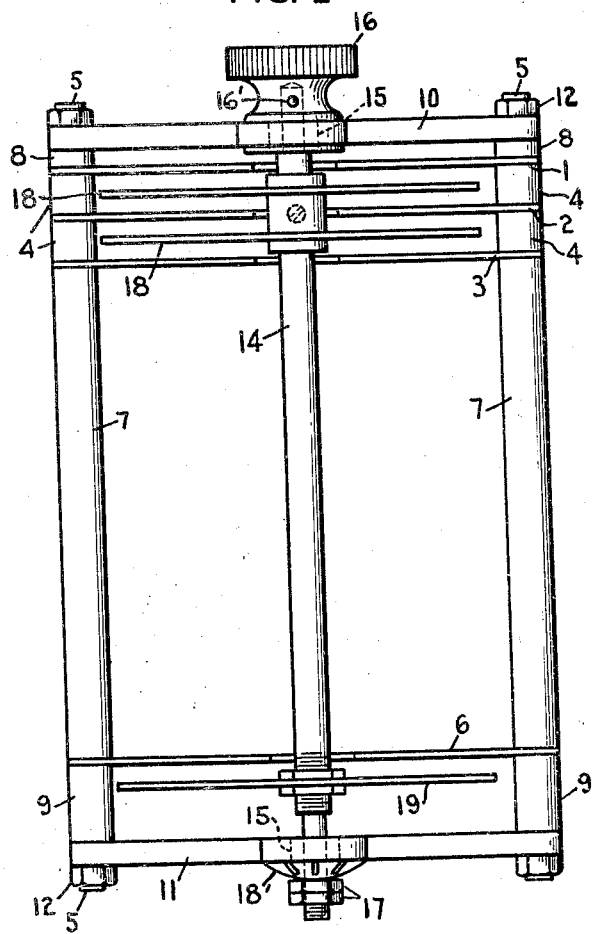
Fig. 1 is a plan of a condenser embodying the invention.

The condenser may be of the type having a rotor shaft grounded on conducting end plates or of the type having the end plates made of insulation material, but for purposes of illustration I have shown the latter type. The stator consists of stator plates 1, 2 and 3 separated by bushings 4 on clamping rods 5 and a compensating stator plate 6 spaced from the other stator plates by long bushings 7 which may, if desired, be of a plurality of shorter bushings such as 4. End bushings 8, 9, separate the end plates 10 and 11 from the stator plates. Nuts 12 on the rods 5 clamp the assembly of main and compensating stator plates rigidly together.

The rotor shaft 14 is made of material that has greater temperature coefficiency of expansion than the bushings 7 and is journalled in bushings 15 in the end plates 10 and 11 which are of insulation. On one end of the shaft 14 is manual knob 16 held by pin 16' and on the other end is a pair of nuts 17 and a spring washer 18'. At normal temperatures one of the nuts 17 would be threaded against washer 18' so as to permit this washer to yield during contraction and expansion of the shaft 14 as the room temperature changes. The other nut 17 would be jammed against the first mentioned nut so as to lock it in position. On this shaft is mounted main rotor plates 18 and compensating rotor plate 19.

At normal temperature, say 20° centigrade, the condenser with a given setting of rotor plates would have a definite capacity. If the temperature should increase with this same setting the stator and rotor plates would increase in area as some function of the coefficient of expansion of the material from which they are made. With this same increase in temperature the rotor shaft 14 will increase in length from end plate 10 more than the bushings 4, 7 and 8 that separate the stator plates from such end plate. Consequently the distance between the rotor plate 19 and the stator plate 6 will vary quite materially and thus offset the increase in capacity due to the increase in area of the plates.

The rotor and stator plates may be made of aluminum, brass or other good conducting metal, as is customary, but the bushings 7 should be made of some metal with low coefficient of expansion and the rotor shaft 14 of a metal of higher coefficient of expansion. The bushings may be made of iron which has a coefficient of expansion in the neighborhood of $9 \times 10^{-6}$ and the rotor shaft may be made of bronze which has, say, a constituency of 93.5% of copper and 6.5% of tin. This gives a coefficient of expansion of about $36 \times 10^{-6}$. By adjusting the length of the shaft 14 the compensating rotor plate 19 can be made to have such distance from its compensating rotor plate 6 as to exactly offset the increase of the effective plate area and thus maintain the capacity constant with change in temperature.

It is advisable to copper-plate the iron bushings or to provide a copper jumper to lower the resistance between plates. When jumpers are used bushings 7 of low expansion non-conducting materials may be used.

Of course the expansion of bushings 4 oppose the increase in capacity due to area increase and this will be added to the effect of the compensating plates. For this reason the bushings may be made of material of high coefficient of expansion.

The axial movement of rotor plates 18 due to expansion does not materially affect the capacity but this change also can be compensated as it is additive to the change due to area increase with centrally located plates and the condenser design can take this into account.

Figure 3:
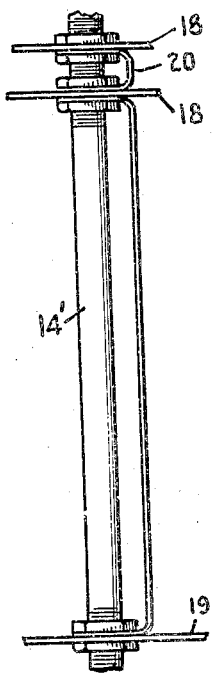
Fig. 3 is a fragmentary view showing a modified rotor shaft.
Figure 2:
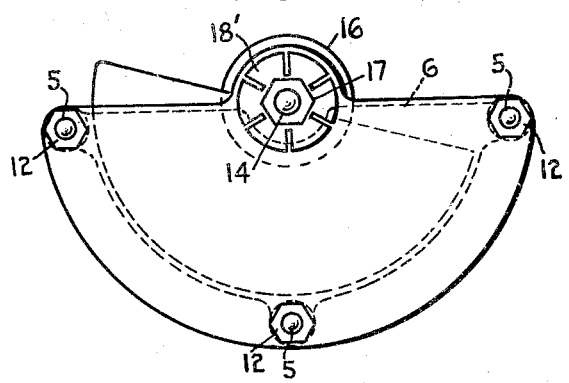
Fig. 2 is an end view of the condenser.

It of course is advisable, if otherwise satisfactory, to choose metal for the plates that has a low coefficient of expansion. Copper has about as low a coefficient of expansion as metals that are otherwise satisfactory, but if iron plates are copper-plated they may be used and advantage obtained of the relatively low coefficient of expansion of this metal. The alloy "Invar" has a very low coefficient of expansion. This is an alloy of nickel and iron and it has recently been shown that by varying the proportions of these metals one can obtain an alloy that has practically zero coefficient of expansion. Invar bushings of this proportion, copper-plated, if desired, may be used on the shafts 5 of the condenser so as to make a greater variation in spacing between the compensating plates 19 and 6 as the temperature varies. Carbon is also a material with low coefficient of expansion and copper plated bushings 7 may likewise be used on the clamping rods 5.

Where a higher compensation is needed the rotor shaft 14 may be made of some non-conducting material with high coefficient of expansion with cables 20 to connect the rotor plates together electrically, as shown in Fig. 3.

Hard rubber may be used for this purpose. It has a coefficient of expansion in the neighborhood of $80 \times 10^{-6}$. Celluloid would be satisfactory also. It has a still higher coefficient of expansion in the neighborhood of $109 \times 10^{-6}$.

Figure 4:
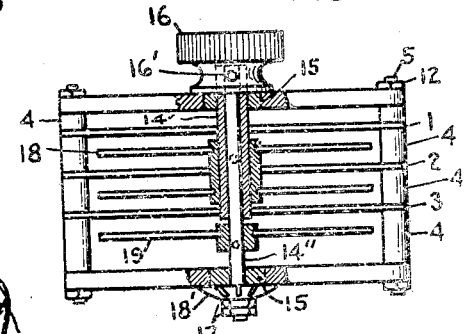
Fig. 4 is a modified form of rotor shaft.

In Fig. 4 I have illustrated a modification in which the stator spaces and the main rotor shaft are both of low expansion material and the compensating shaft is of high expansion. In this figure similar reference characters are used for similar parts in the other figures. The spacers 4, rods 5 and shaft 14' have low coefficients of expansion. There is therefore minimum change in the spaces D between the main rotor and stator plates. The shaft 14" passes freely through the tubular shaft 14' and both are fastened to the knob 16 by the pin 16'. The reduced free end of shaft 14" is journaled in the bushing 15 of the end plate 11.

In the modification of Fig. 4 if the temperature should increase the compensating shaft 14" would expand more rapidly than the shaft 14', bushings 4, and the distance between the auxiliary rotor plate 19 and the common stator plate 3 would increase. Consequently, the increase of capacity due to the increase of area in all the plates would be counteracted by the increased separation between the rotor plate 19 and its associated stator plate 3. With this arrangement one is able to obtain a shorter condenser than in the type of Fig. 1 and in addition the main rotor plates are maintained midway between the stator plates for all practical purposes.

While I have described the rotor shaft as having the higher coefficient of expansion it will be apparent that the stator bushings or other stator support can be made to have the greater coefficient with the same result if positioned outside the rotor plate 19 of Fig. 3.

Having described my invention, what I claim is:

1. An electrical condenser unit consisting of a frame, plates secured to said frame, a rotatable shaft of low coefficient of expansion, an additional plate secured to said shaft in spaced relation to one of the first mentioned plates, a shaft of high coefficient of expansion fastened to the first shaft and a compensating plate secured to the end of the second shaft and spaced outside of another of said first mentioned plates.

2. An electrical condenser unit consisting of a frame, a plurality of stator plates secured to said frame, a shaft rotatingly secured to said frame, a plurality of rotor plates connected to move with said shaft, a second shaft connected to rotate with the first shaft and having a higher coefficient of expansion than that of the first shaft and an additional rotor plate on the second shaft capacitatively positioned in respect to one of said stator plates.

STUART W. SEELEY.